US011818185B2

(12) United States Patent
Mitra et al.

(10) Patent No.: US 11,818,185 B2
(45) Date of Patent: Nov. 14, 2023

(54) AUDIO STREAMING FROM HOST BLUETOOTH DEVICE TO MULTIPLE RECEIVING BLUETOOTH DEVICES

(71) Applicant: L&T TECHNOLOGY SERVICES LIMITED, Chennai (IN)

(72) Inventors: Abhirup Anjan Mitra, Bharuch (IN); Sanjay Shivkumar Mishra, Bangalore (IN); Avinash Ramesh Barai, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 17/042,582

(22) PCT Filed: Mar. 28, 2019

(86) PCT No.: PCT/IB2019/052527
§ 371 (c)(1),
(2) Date: Sep. 28, 2020

(87) PCT Pub. No.: WO2019/186443
PCT Pub. Date: Oct. 3, 2019

(65) Prior Publication Data
US 2021/0084089 A1    Mar. 18, 2021

(30) Foreign Application Priority Data

Mar. 28, 2018   (IN) .............................. 201841011617

(51) Int. Cl.
*H04L 65/60* (2022.01)
*H04W 4/80* (2018.01)
(Continued)

(52) U.S. Cl.
CPC ............ *H04L 65/60* (2013.01); *G10L 19/167* (2013.01); *G10L 25/60* (2013.01); *H04W 4/80* (2018.02)

(58) Field of Classification Search
CPC ........ H04L 65/60; H04W 4/80; G10L 19/167; G10L 25/60
See application file for complete search history.

(56) References Cited

U.S. PATENT DOCUMENTS

2008/0287063 A1* 11/2008 Kidron .................. G10L 19/167
455/41.2
2011/0129048 A1* 6/2011 Barbe ............... H04W 56/0015
375/371
(Continued)

*Primary Examiner* — William G Trost, IV
*Assistant Examiner* — Monishwar Mohan (57) ABSTRACT

This disclosure relates to methods and systems for providing contemporaneous audio streaming from a host Bluetooth device (201) to a plurality of receiving Bluetooth devices (202). In an embodiment, a method (400) may include disabling a stream end point (SEP) restriction in an audio streaming profile of a Bluetooth protocol stack of the host Bluetooth device (201) to allow contemporaneous connection between the host Bluetooth device (201) and each of the plurality of receiving Bluetooth devices (202). The method may further include creating one or more streaming sessions in the Bluetooth protocol stack in response to one or more connection requests from one or more receiving Bluetooth devices, wherein the one or more streaming sessions are mutually independent of each other, and wherein each streaming session correspond to one receiving Bluetooth device and comprise an instance of an audio streaming protocol and an instance of a streaming channel.

14 Claims, 5 Drawing Sheets

(51) Int. Cl.
G10L 19/16 (2013.01)
G10L 25/60 (2013.01)

(56) References Cited

U.S. PATENT DOCUMENTS

| | | | |
|---|---|---|---|
| 2014/0351867 A1* | 11/2014 | Hommel | H04N 21/4126 |
| | | | 725/75 |
| 2016/0286337 A1* | 9/2016 | Thekkedathu Sivaraman | ............ |
| | | | H04L 69/14 |
| 2018/0027034 A1* | 1/2018 | Goupy | H04L 65/65 |
| | | | 709/219 |
| 2019/0132792 A1* | 5/2019 | Ramappa | H04L 65/765 |
| 2020/0259877 A1* | 8/2020 | Girardier | H04B 17/309 |

* cited by examiner

AUDIO STREAMING FROM HOST BLUETOOTH DEVICE TO MULTIPLE RECEIVING BLUETOOTH DEVICES

TECHNICAL FIELD

This disclosure relates generally to Bluetooth devices, and more particularly to method and system for providing contemporaneous audio streaming from a host Bluetooth device to a plurality of receiving Bluetooth devices.

BACKGROUND

Media streaming is an important part of infotainment systems, such as infotainment systems for cars. Advanced infotainment systems may be equipped with various connectivity options, which may include Bluetooth, Wi-Fi, interactive voice recognition services, live media streaming service, smart technology for mobile integration, etc. Technological enhancements and innovations have made seamless media sharing and streaming possible through different interfaces. For example, these interfaces my Bluetooth, include Ethernet Accelerated Virtual Port (AVP), Wi-Fi, Universal Plug and Play (UPnP), mirroring, etc.

Among the various interfaces available, Bluetooth has assumed a relatively greater significance in infotainment systems, for its ease of use, seamless connectivity, and its ability to support various profiles, such as Hands Free Profile (HFP), Phonebook Access Profile (PBAP), Message Access Profile (MAP), Serial Port Profile (SPP), Advanced Audio Distribution Profile (A2DP), and so on. As such, Bluetooth enabled speakers have amassed popularity for in the infotainment systems of cars for streaming audio form the audio source.

However, as far as multimedia (audio, video, or image) streaming is concerned, Bluetooth (until Bluetooth version 4.1) lacks the capability of multicasting i.e. streaming to multiple devices. As it will be appreciated by those skilled in the art, Advanced Audio Distribution Profile (A2DP) may be employed for Bluetooth connectivity. It will be further appreciated that the A2DP in its original form doesn't allow audio streaming to more than one device (such as Bluetooth enabled speakers). For example, two or more users may require multimedia content to be streamed simultaneously on their respective Bluetooth enabled devices (for example, Bluetooth speakers) from a single host Bluetooth device (audio source, such as media player). However, the current Bluetooth techniques lack such capability.

SUMMARY

In one embodiment, a method for of providing contemporaneous audio streaming from a host Bluetooth device to a plurality of receiving Bluetooth devices is disclosed. In one example, the method may include disabling a stream end point (SEP) restriction in an audio streaming profile of a Bluetooth protocol stack of the host Bluetooth device to allow contemporaneous connection between the host Bluetooth device and each of the plurality of receiving Bluetooth devices. The method may further include creating one or more streaming sessions in the Bluetooth protocol stack in response to one or more connection requests from one or more receiving Bluetooth devices from among the plurality of receiving Bluetooth devices, wherein the one or more streaming sessions are mutually independent of each other, and wherein each streaming session correspond to one receiving Bluetooth device and comprise an instance of an audio streaming protocol and an instance of a streaming channel.

In one embodiment, a system for providing contemporaneous audio streaming from a host Bluetooth device to a plurality of receiving Bluetooth devices is disclosed. In one example, the system may include the Bluetooth host device, which may include at least one processor and a memory communicatively coupled to the at least one processor. The memory may store processor-executable instructions, which, on execution, may cause the processor to disable a stream end point (SEP) restriction in an audio streaming profile of a Bluetooth protocol stack of the host Bluetooth device to allow contemporaneous connection between the host Bluetooth device and each of the plurality of receiving Bluetooth devices. The processor-executable instructions, on execution, may further cause the processor to create one or more streaming sessions in the Bluetooth protocol stack in response to one or more connection requests from one or more receiving Bluetooth devices from among the plurality of receiving Bluetooth devices, wherein the one or more streaming sessions are mutually independent of each other, and wherein each streaming session correspond to one receiving Bluetooth device and comprise an instance of an audio streaming protocol and an instance of a streaming channel.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to FIG. 1, an exemplary Bluetooth stack protocol architecture 100 is illustrated, in accordance with some embodiments of the present disclosure. The Bluetooth stack protocol architecture 100 may include a Bluetooth stack library 101. By way of an example, the Bluetooth stack library 101 may be a BlueZ Core. The Bluetooth stack library 101 may be communicatively coupled to a Bluetooth hardware. In some embodiments, the Bluetooth stack library 101 may be communicatively coupled to the Bluetooth hardware via a Host Controller Interface (HCl) protocol, in order to execute general control of the Bluetooth hardware. It may be understood that the general control of the Bluetooth hardware may include reading hardware (HW) features and versions, initiating scanning states, parsing out scanning results, managing connections, and so on.

Figure 1:
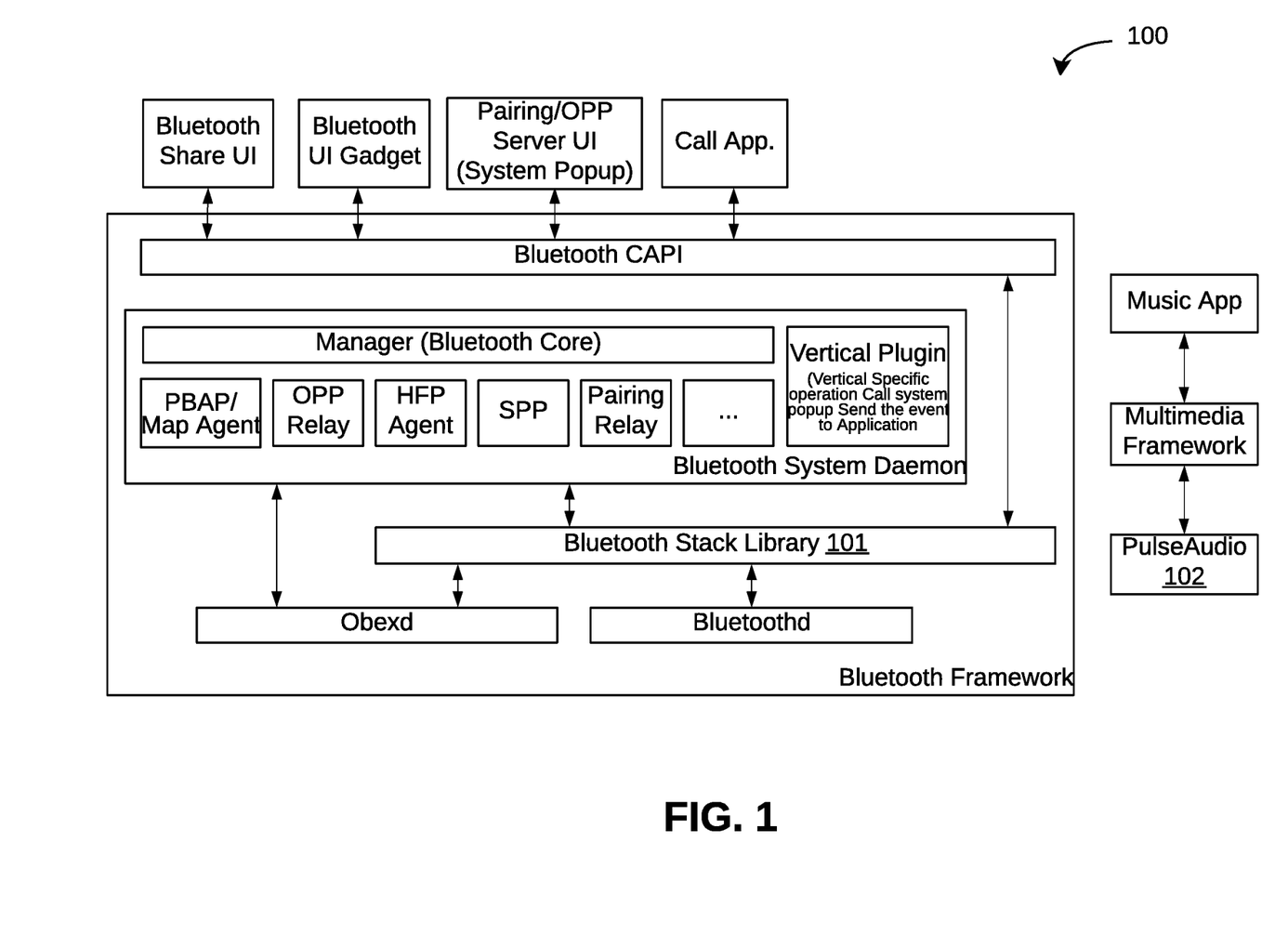
FIG. 1 is an exemplary Bluetooth stack protocol architecture, in accordance with some embodiments of the present disclosure.

In some embodiments, for streaming multimedia content, such as audio, the Bluetooth stack library 101 may establish transport links. In some embodiments, the Bluetooth stack protocol architecture 100 may further include a sound server program, for streaming over the established transport links. By way of an example, the sound server program may be Pulseaudio™ 102.

Figure 2:
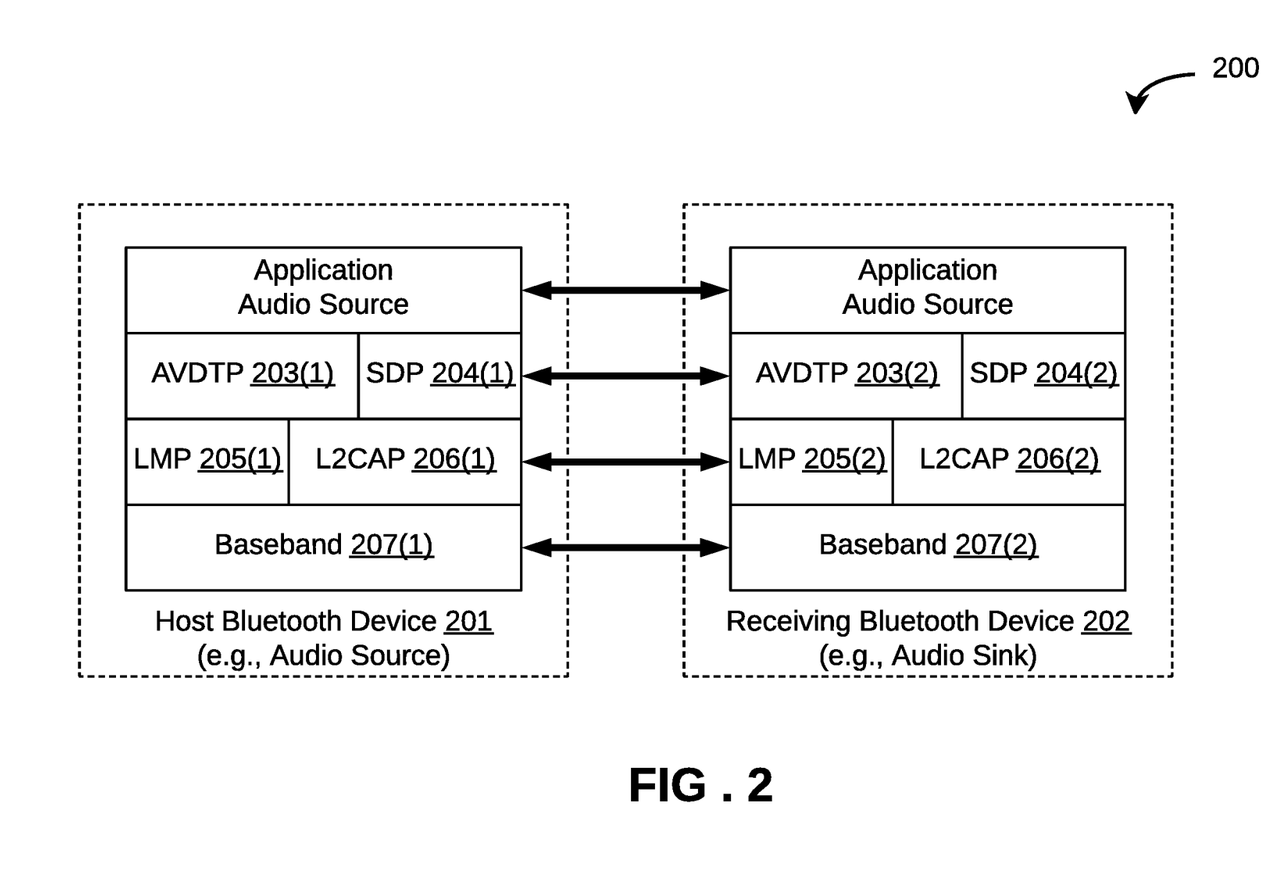
FIG. 2 is an Advanced Audio Distribution Profile (A2DP) architecture, in accordance with some embodiments of the present disclosure.

Referring now to FIG. 2, an Advanced Audio Distribution Profile (A2DP) architecture 200 is illustrated, in accordance with some embodiments of the present disclosure. As it will be appreciated by those skilled in the art, A2DP may define how audio content may be streamed from a host Bluetooth device (audio source device) to a receiving Bluetooth device (audio sink device) over a Bluetooth connection. As shown in the FIG. 2, the A2DP architecture 200 may include one or more layers through which a connection between a host Bluetooth device (audio source device) 201 and a receiving Bluetooth device (audio sink device) 202 may be established. By way of an example, the one or more layers may include an Audio Video distribution protocol (AVDTP) layer 203(1)-203(2), a Session Description Protocol (SDP) layer 204(1)-204(2), a Link Management Protocol (LMP) layer 205(1)-205(2), a Logical Link Control and Adaptation Layer Protocol (L2CAP) layer 206(1)-206(2), and a baseband layer 207(1)-207(2).

The AVDTP layer 203(1)-203(2) may be responsible for establishing stream connection between the host Bluetooth device 201 and the receiving Bluetooth device 202, and signaling between the host Bluetooth device 201 and the receiving Bluetooth device 202. In some embodiments, the AVDTP layer 203(1)-203(2) may store information about a Stream End Point (SEP). It may be noted that the SEP may expose available transport services and multimedia (audio, video, image, etc.) capabilities of an application in order to negotiate a stream. In some embodiments, the stream connection and the signaling between the host Bluetooth device 201 and the receiving Bluetooth device 202 may be established by a series of commands specific to AVDTP layer 203(1)-203(2).

It may be noted that stream end point (SEP) restriction may exist in an audio streaming profile of a Bluetooth protocol stack of a host Bluetooth device that may prevent contemporaneous connection between the host Bluetooth device and a plurality of receiving Bluetooth devices. Therefore, in order, to allow contemporaneous connection between the host Bluetooth device and each of the plurality of receiving Bluetooth devices, the SEP restriction in the audio streaming profile of the Bluetooth protocol stack 101 of the host Bluetooth device may have to be removed.

Figure 3:
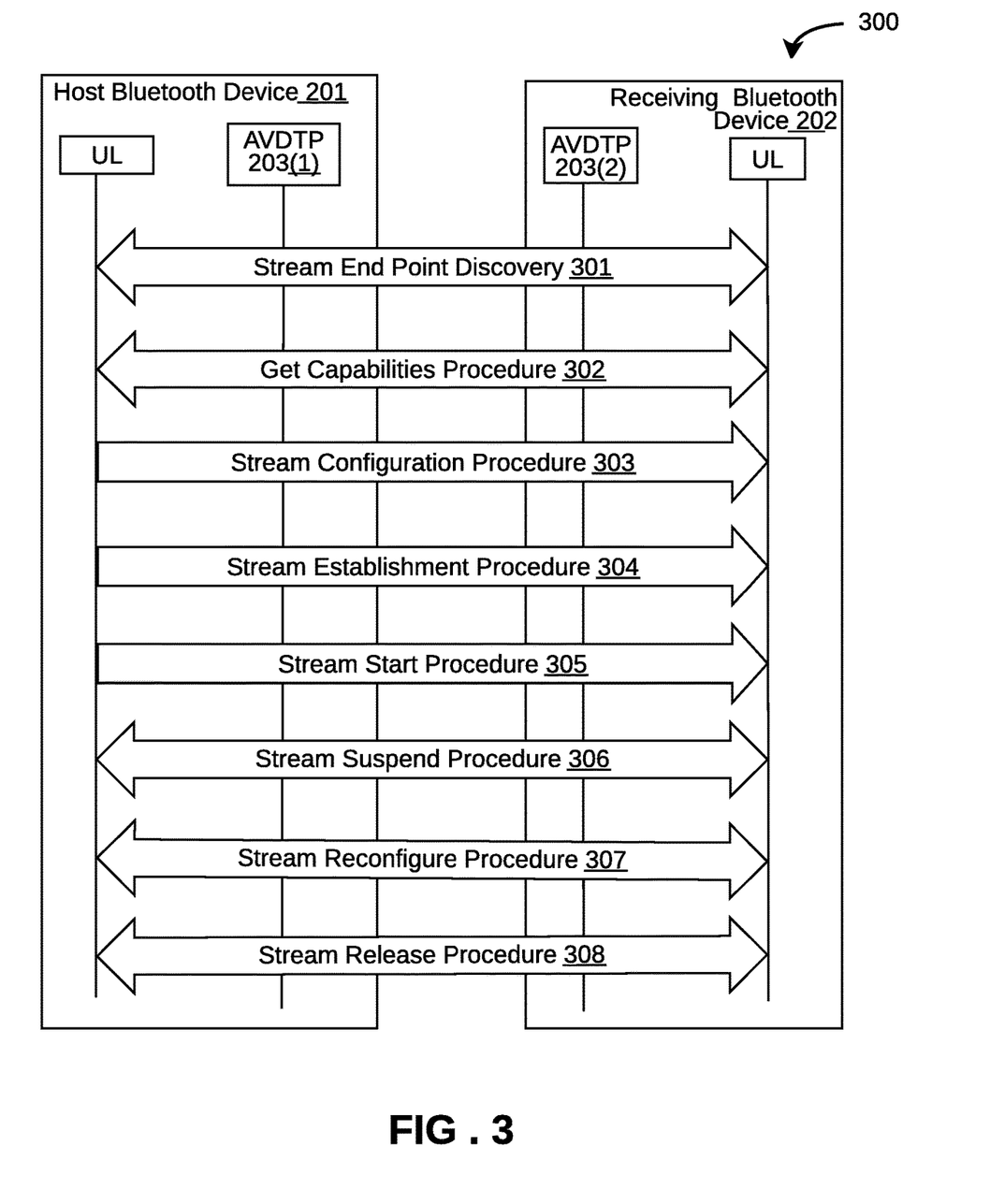
FIG. 3 is an exemplary process for a connection establishment of Audio Video distribution protocol (AVDTP), in accordance with some embodiments of the present disclosure.

Referring now to FIG. 3, an exemplary process 300 for establishing a connection of AVDTP 203(1) and 204(2) is illustrated, in accordance with some embodiments of the present disclosure. At 301, a stream endpoint (SEP) discovery may be initiated. In some embodiments, an INT module or an initiator module may initiate a discovery for a list of available SEPs. At 302, information about capabilities may be obtained. At 303, information about stream configuration may be obtained. It may be understood that the information about the capabilities and the information about the stream configuration may be important for establishing the streaming between a host Bluetooth device 210 and a receiving Bluetooth device 202. At 304, streaming between the host Bluetooth device 201 and the receiving Bluetooth device 202 may be established.

Once the streaming between the host Bluetooth device 201 and the receiving Bluetooth device 202 is established, a streaming channel may get created for carrying media (audio or video or image) streams, at 305. In some embodiments, in order to establish streaming, the server program may interact with the Bluetooth stack library, and may gather required parameters for streaming. For example, referring back to FIG. 1, the Pulseaudio™ 102 may interact with the Bluetooth stack library 101, via a Dbus for gathering required parameters for streaming. At 306, the streaming may be suspended, as per requirement. At 307, the streaming reconfiguration may be performed, and at 308, streaming release procedure may be performed, as per requirement.

Figure 4:
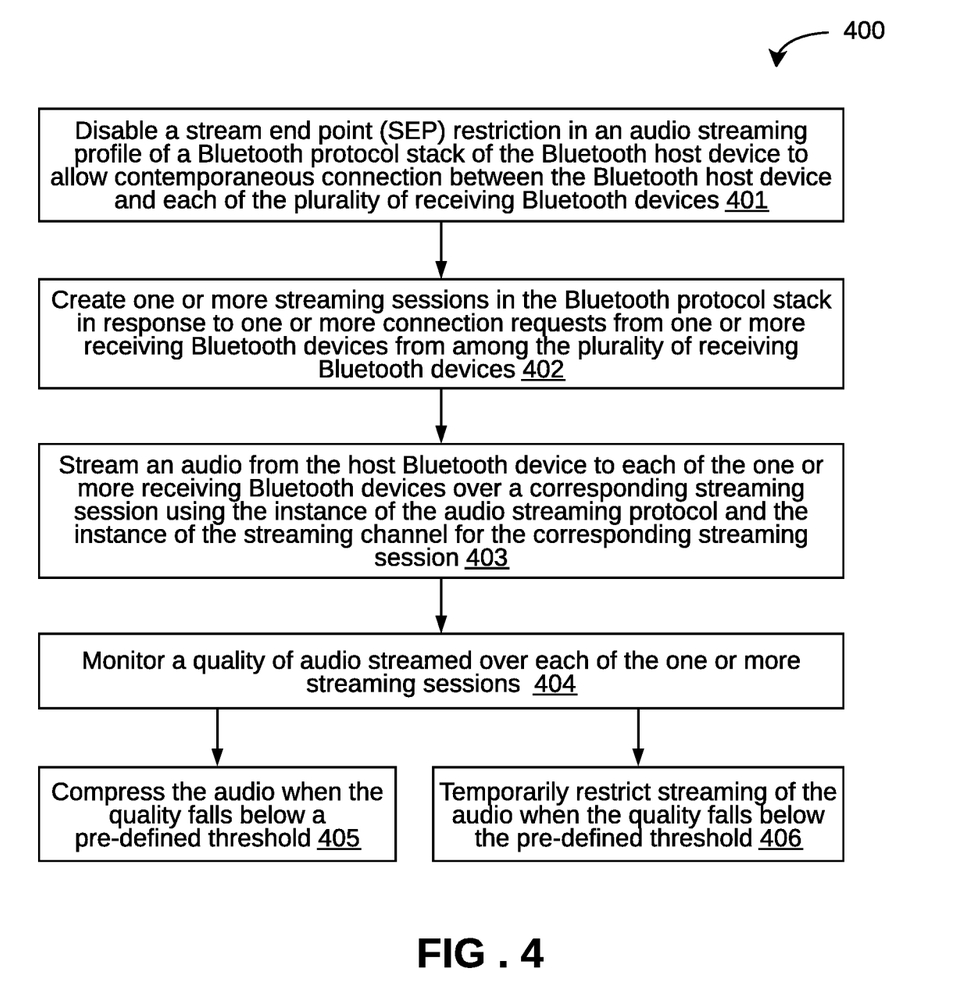
FIG. 4 is a flow diagram of an exemplary process for providing contemporaneous audio streaming from a host Bluetooth device to a plurality of receiving Bluetooth devices, in accordance with some embodiments of the present disclosure.

Referring now to FIG. 4, a flow diagram of an exemplary process 400 for providing contemporaneous audio streaming from a host Bluetooth device to a plurality of receiving Bluetooth devices is illustrated, in accordance with some embodiments of the present disclosure. At step 401, a stream end point (SEP) restriction in an audio streaming profile of a Bluetooth protocol stack of the host Bluetooth device may be disabled to allow contemporaneous connection between the host Bluetooth device and each of the plurality of receiving Bluetooth devices. At step 402, one or more streaming sessions may be created in the Bluetooth protocol stack in response to one or more connection requests from one or more receiving Bluetooth devices from among the plurality of receiving Bluetooth devices. Additionally, at step 403, an audio may be streamed from the host Bluetooth device to each of the one or more receiving Bluetooth devices over a corresponding streaming session using the instance of the audio streaming protocol and the instance of the streaming channel for the corresponding streaming session. At step 404, a quality of audio streamed over each of the one or more streaming sessions may be monitored. At step 405, the audio may be compressed when the quality falls below a pre-defined threshold. Alternatively, at step 406, streaming of the audio may be temporarily restricted when the quality falls below the pre-defined threshold.

At step 401, the stream end point (SEP) restriction in the audio streaming profile of the Bluetooth protocol stack 102 of the host Bluetooth device may be disabled to allow contemporaneous connection between the host Bluetooth device and each of the plurality of receiving Bluetooth devices. In some embodiments, disabling the SEP restriction may include removing a corresponding Boolean lock. The audio streaming profile may include an advanced audio distribution profile (A2DP). At step 402, one or more streaming sessions may be created in the Bluetooth protocol stack 102 in response to one or more connection requests from one or more receiving Bluetooth devices from among the plurality of receiving Bluetooth devices. The one or more streaming sessions may be mutually independent of each other. It may be noted that each streaming session may correspond to one receiving Bluetooth device and may include an instance of an audio streaming protocol and an instance of a streaming channel. The audio streaming protocol may include an audio video distribution transport protocol (AVDTP). It may be noted that the in order to provide contemporaneous audio streaming from a host Bluetooth device to a plurality of receiving Bluetooth devices, multiple object instances of AVDTP and AVDTP stream objects may be created. By way of an example, when multiple streams are created, callbacks to different streams may be handled independently for each state. By independently handling each of the stream callbacks, different states of screaming channels can be handled without affecting other streaming channels.

At step 403, an audio may be streamed from the host Bluetooth device to each of the one or more receiving Bluetooth devices over a corresponding streaming session using the instance of the audio streaming protocol and the instance of the streaming channel for the corresponding streaming session. In some embodiments, in order to stream an audio from the host Bluetooth device to each of the one or more receiving Bluetooth devices, an independent card may be created for each of the of the one or more receiving Bluetooth devices. In some embodiments, a common sink may be created in the host Bluetooth device for the one or more receiving Bluetooth devices to synchronize transmission of one or more audio streams to the one or more receiving Bluetooth devices. Further, in some embodiments, a callback associated with each of the one or more streaming sessions may be handled independently.

At step 404, upon streaming an audio from the host Bluetooth device to each of the one or more receiving Bluetooth devices, a quality of the audio streamed over each of the one or more streaming sessions may be monitored. Based on the monitoring, if it is determined that the audio quality falls below a pre-defined threshold, one or more steps may be taken. For example, at step 405, the audio may be compressed when the quality falls below a pre-defined threshold. In some embodiments, the compressing the audio may include adjusting the bitrate of the audio. Alternatively, at step 406, streaming of the audio may be temporarily restricted when the quality falls below the pre-defined threshold.

Figure 5:
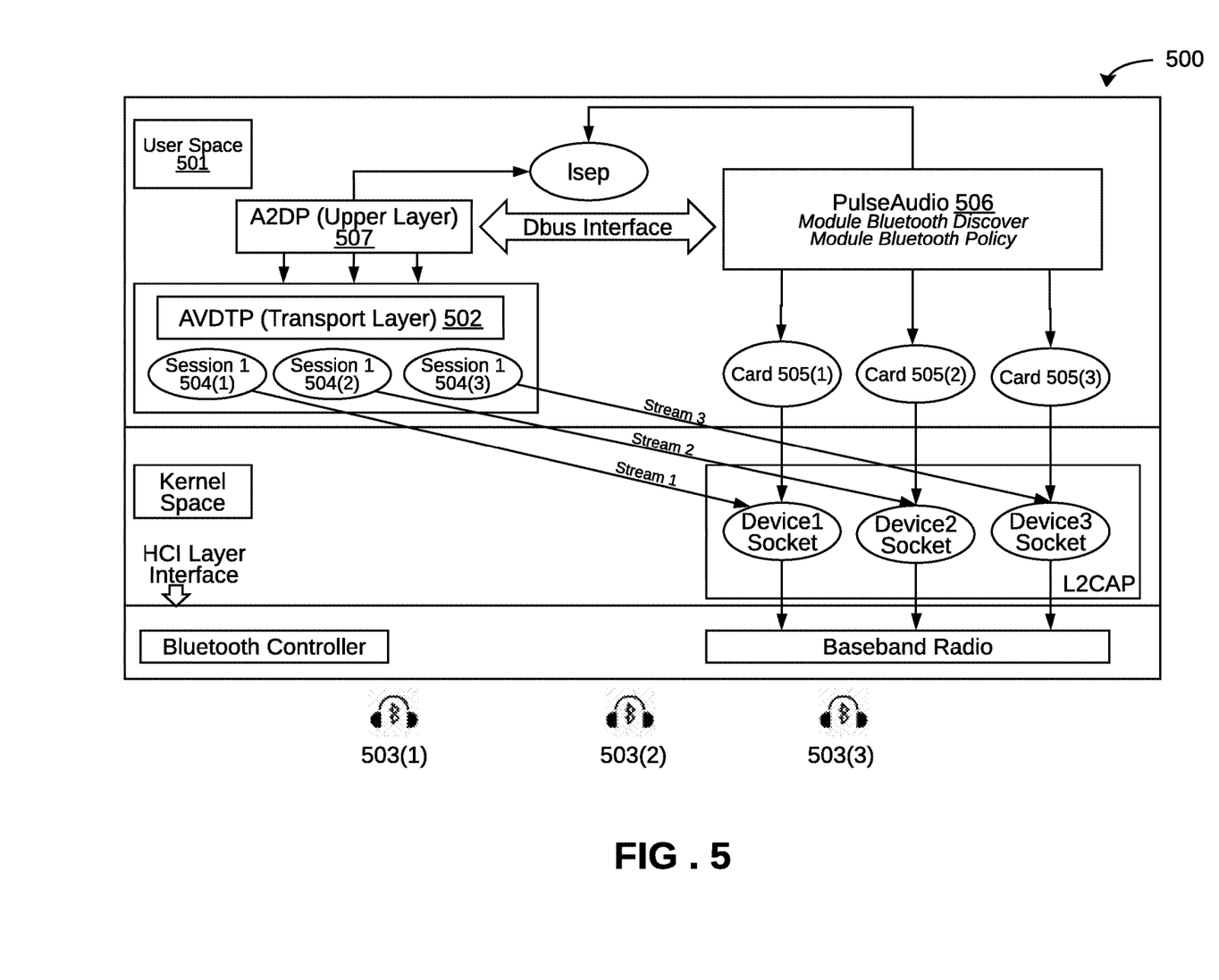
FIG. 5 is an implementation of an audio streaming feature over Bluetooth interface for streaming audio to three receiving Bluetooth devices, in accordance with some embodiments of the present disclosure.

Referring now to FIG. 5, an implementation of an audio streaming feature over a Bluetooth interface for streaming audio from a host Bluetooth device to three receiving Bluetooth devices simultaneously is illustrated, in accordance with some embodiments of the present disclosure. The host Bluetooth device and the receiving Bluetooth devices 503(1), 503(2), 503(3) may be connected via Bluetooth connection, in a hands free profile (HFP) or an Advanced Audio Distribution Profile (A2DP) 507, so as to be able to stream audio. It may be understood that sufficient bandwidth may be provided for allowing the host Bluetooth device and the receiving Bluetooth devices 503(1), 503(2), 503(3) to be connected in the HFP or A2DP 507.

In some embodiments, one or more code changes may be made in a user space 501 in or order to support multiple sessions and streams. For example, the code changes may be made in the Audio/Video Distribution Transport Protocol (AVDTP) layer 502 to support the multiple sessions and streams. Accordingly, multiple sessions 504(1), 504(2), 504(3) may be established for each of the three receiving Bluetooth devices 503(1), 503(2), 503(3). In other words, each of the three receiving Bluetooth devices 503(1), 503(2), 503(3) may have an individual session, and a stream reference. In some embodiments, the stream reference may include parameters for setting up the stream and streaming media.

As a connection is established contemporaneously between the host Bluetooth device and the receiving Bluetooth devices 503(1), 503(2), 503(3), a sound server (Pulseaudio) 506 may create three independent cards 505(1), 505(2), 505(3) for each of the three receiving Bluetooth devices 503(1), 503(2), 503(3), respectively. In some embodiments, the audio may be streamed to each of the three receiving Bluetooth devices 503(1), 503(2), 503(3). The three receiving Bluetooth devices 503(1), 503(2), 503(3) may also be referred to as sinks 503(1), 503(2), 503(3). In some embodiments, the three receiving Bluetooth devices 503(1), 503(2), 503(3) may be combined to create a common sink to have better synchronization. By way of an example, an application like Gstreamer may be used stream audio to each of the three receiving Bluetooth devices 503(1), 503(2), 503(3), and combining the three receiving Bluetooth devices 503(1), 503(2), 503(3).

It may be noted that in some embodiments, when a connection is simultaneously established between a host Bluetooth device and a plurality of receiving Bluetooth devices, the plurality of receiving Bluetooth devices may receive the same audio from the host Bluetooth device. In alternate embodiments, the plurality of receiving Bluetooth devices may receive different audio from the host Bluetooth device, corresponding to the different sessions existing between the host Bluetooth device and each of the plurality of receiving Bluetooth devices.

By way of an example, the Bluetooth stack library may be a Bluetooth BlueZ stack, version 5.37. Further, by way of an example, the invention may be implemented in the following hardware: the host Bluetooth device may be a BT 4.2 with Basic Rate/Enhanced Data Rate (BR/EDR) support. The host Bluetooth device may be used to connect to a plurality of receiving Bluetooth devices, such as Bluetooth speakers. It may be noted that the A2DP 507 and AVDTP 502 may be modified in order to providing contemporaneous audio streaming from the host Bluetooth device to the plurality of receiving Bluetooth devices.

As will be appreciated by those skilled in the art, the techniques described in the various embodiments discussed above relate to Bluetooth wireless technology, specifically to audio streaming profile A2DP. The techniques allow for multimedia content to be streamed from a host Bluetooth device to a plurality of receiving Bluetooth devices. Further, the techniques do not require any hardware modifications. As such, the techniques are easy to implement. Further, by doing away with the any hardware modifications, the techniques provide for a cost efficient, time efficient, and labor efficient solution. The techniques allow the plurality of receiving Bluetooth devices to receive the same audio from the host Bluetooth device. Moreover, by establishing different sessions, the techniques further allow for streaming different audio from the host Bluetooth device to plurality of receiving Bluetooth devices, corresponding to the different sessions existing between the host Bluetooth device and each of the plurality of receiving Bluetooth devices.

It is intended that the disclosure and examples be considered as exemplary only, with a true scope and spirit of disclosed embodiments being indicated by the following claims.

What is claimed is:

1. A method of providing contemporaneous audio streaming from a host Bluetooth device to a plurality of receiving Bluetooth devices, the method comprising:

disabling a stream end point (SEP) restriction in an audio streaming profile of a Bluetooth protocol stack of the host Bluetooth device by removing a corresponding Boolean lock to allow contemporaneous connection between the host Bluetooth device and each of the plurality of receiving Bluetooth devices; and creating one or more streaming sessions in the Bluetooth protocol stack in response to one or more connection requests from one or more receiving Bluetooth devices from among the plurality of receiving Bluetooth devices, wherein the one or more streaming sessions are mutually independent of each other, wherein each streaming session correspond to one receiving Bluetooth device and comprise an instance of an audio streaming protocol and an instance of a streaming channel, wherein callbacks of each streaming session of the same audio streaming profile are handled independently for each state of the streaming channel, and wherein the audio streaming profile is an Advanced Audio Distribution Profile (A2DP).

2. The method of claim 1, further comprising streaming an audio from the host Bluetooth device to each of the one or more receiving Bluetooth devices over a corresponding streaming session using the instance of the audio streaming protocol and the instance of the streaming channel for the corresponding streaming session.

3. The method of claim 2, further comprising creating an independent card for each of the of the one or more receiving Bluetooth devices.

4. The method of claim 2, further comprising creating a common sink in the host Bluetooth device for the one or more receiving Bluetooth devices to synchronize transmission of one or more audio streams to the one or more receiving Bluetooth devices.

5. The method of claim 1, further comprising:
monitoring a quality of an audio streamed over each of the one or more streaming sessions; and
compressing the audio when the quality falls below a pre-defined threshold.

6. The method of claim 1, wherein the audio streaming protocol comprises an audio video distribution transport protocol (AVDTP).

7. The method of claim 1, further comprising:
monitoring a quality of an audio streamed over each of the one or more streaming sessions; and
temporarily restricting streaming of the audio when the quality falls below the pre-defined threshold.

8. A system for providing contemporaneous audio streaming from a host Bluetooth device to a plurality of receiving Bluetooth devices, the system comprising:
the Bluetooth host device comprising at least one processor and a computer-readable medium storing instructions that, when executed by the at least one processor, cause the at least one processor to perform operations comprising:
disabling a stream end point (SEP) restriction in an audio streaming profile of a Bluetooth protocol stack of the host Bluetooth device by removing a corresponding Boolean lock to allow contemporaneous connection between the host Bluetooth device and each of the plurality of receiving Bluetooth devices; and
creating one or more streaming sessions in the Bluetooth protocol stack in response to one or more connection requests from one or more receiving Bluetooth devices from among the plurality of receiving Bluetooth devices, wherein the one or more streaming sessions are mutually independent of each other, wherein each streaming session correspond to one receiving Bluetooth device and comprise an instance of an audio streaming protocol and an instance of a streaming channel, and wherein callbacks of each streaming session of the same audio streaming profile are handled independently for each state of the streaming channel, and wherein the audio streaming profile is an Advanced Audio Distribution Profile (A2DP).

9. The system of claim 8, wherein the operations further comprise streaming an audio from the host Bluetooth device to each of the one or more receiving Bluetooth devices over a corresponding streaming session using the instance of the audio streaming protocol and the instance of the streaming channel for the corresponding streaming session.

10. The system of claim 9, wherein the operations further comprise creating an independent card for each of the of the one or more receiving Bluetooth devices.

11. The system of claim 9, wherein the operations further comprise creating a common sink in the host Bluetooth device for the one or more receiving Bluetooth devices to synchronize transmission of one or more audio streams to the one or more receiving Bluetooth devices.

12. The system of claim 8, wherein the operations further comprise:
monitoring a quality of an audio streamed over each of the one or more streaming sessions; and
compressing the audio when the quality falls below a pre-defined threshold.

13. The system of claim 8, wherein the audio streaming protocol comprises an audio video distribution transport protocol (AVDTP).

14. The system of claim 8, wherein the operations further comprise:
monitoring a quality of an audio streamed over each of the one or more streaming sessions; and
temporarily restricting streaming of the audio when the quality falls below the pre-defined threshold.

* * * * *